(12) United States Patent
Bergen et al.

(10) Patent No.: US 7,590,178 B2
(45) Date of Patent: Sep. 15, 2009

(54) METHOD OF MULTIPLEXING A NUMBER OF VIDEO SIGNALS WITH A COMPRESSOR

(75) Inventors: Franciscus Herman Maria Bergen, Eindhoven (NL); Jennifer Lynn Randall, Lititz, PA (US); Bruce Daniel Magid, Lancaster, PA (US)

(73) Assignee: Robert Bosch GmbH, Stuttgart (DE)

( * ) Notice: Subject to any disclaimer, the term of this patent is extended or adjusted under 35 U.S.C. 154(b) by 505 days.

(21) Appl. No.: 10/275,630

(22) PCT Filed: Mar. 5, 2002

(86) PCT No.: PCT/IB02/00695

§ 371 (c)(1),
(2), (4) Date: Nov. 7, 2002

(87) PCT Pub. No.: WO02/080576

PCT Pub. Date: Oct. 10, 2002

(65) Prior Publication Data
US 2003/0169338 A1 Sep. 11, 2003

(30) Foreign Application Priority Data
Mar. 12, 2001 (EP) .................................. 01200906

(51) Int. Cl.
*H04B 1/66* (2006.01)
(52) U.S. Cl. .......................... 375/240.12; 375/240.24; 375/240.14; 375/240.01; 382/238; 382/236; 348/14.13; 348/14.15

(58) Field of Classification Search ............ 375/240.12, 375/240.26, 240.01, 240.28, 240.13, 240.14, 375/240.24, 240.07, 240.02; 386/109; 348/423, 348/14.13, 14.15; 382/232, 238, 236
See application file for complete search history.

(56) References Cited
U.S. PATENT DOCUMENTS

| | | | |
|---|---|---|---|
| 4,941,053 A * | 7/1990 | Hienerwadel et al. ....... 382/238 |
| 5,144,445 A | 9/1992 | Higashitsutsumi |
| 5,617,145 A * | 4/1997 | Huang et al. ............. 348/423.1 |
| 5,633,683 A | 5/1997 | Rosengren et al. .......... 348/385 |
| 5,973,722 A * | 10/1999 | Wakai et al. ................... 725/76 |
| 6,011,901 A * | 1/2000 | Kirsten ....................... 386/123 |
| 6,049,353 A * | 4/2000 | Gray ........................... 348/159 |
| 6,108,027 A * | 8/2000 | Andrews et al. ......... 348/14.14 |
| 6,141,387 A | 10/2000 | Zhang |
| 6,167,091 A * | 12/2000 | Okada et al. ........... 375/240.19 |
| 6,868,121 B2 * | 3/2005 | Miyazawa ............. 375/240.07 |

FOREIGN PATENT DOCUMENTS

| | | |
|---|---|---|
| CN | 1239365 | 12/1999 |
| EP | 0 711 080 A | 5/1996 |
| EP | 0855840 A1 | 7/1998 |
| FR | 2780843 A1 | 1/2000 |

* cited by examiner

*Primary Examiner*—Shawn An
(74) *Attorney, Agent, or Firm*—Kenyon & Kenyon LLP

(57) ABSTRACT

The present invention relates to a method of and an apparatus for multiplexing a number of video signals, in which to save circuits for compressors the video signals are reduced in their information, combined into a single video signal, and then the video signal is compressed by one compressor.

18 Claims, 3 Drawing Sheets

METHOD OF MULTIPLEXING A NUMBER OF VIDEO SIGNALS WITH A COMPRESSOR

FIELD OF THE INVENTION

The present invention relates to a method of multiplexing a number of video signals with a compressor.

BACKGROUND INFORMATION

In order to be able to transmit a video signal digitally, a standard has been defined by ISO/IEC and laid down as MPEG2 Standard ISO/IEC 13818 for video compression, audio compression and multimedia multiplexing. European Published Patent Application 0 855 840, which refers to a system with a digital signal multiplexer and a digital signal demultiplexer. In the multiplexer of this system a first number of digital video signals are first multiplexed into a multiplexed digital signal in order to send this to the demultiplexer of this system. The digital video signals are all television signals for broadcast programmes. Each programme is alternatively also referred to as a channel. Each digital video signal contains either a digital audio signal or a data signal or both. Digital signals coming from video sources are coded, packed, multiplexed in the multiplexer and then passed as a serial data stream to a transfer section. On the other side of the transfer section a signal of a television channel is filtered out from the serial data stream. The multiplexer, however, is not explained in detail here and no process of compression is specified.

SUMMARY OF THE INVENTION

The present invention includes an exemplary method of compression, in which a multiplexer is provided having a computer structure of a memory and control.

According to a first exemplary embodiment of the present invention, the video signals are reduced as regards their information, then combined into a single video signal, and the video signal is then compressed by the one compressor, which may save circuits for compressors.

According to a second exemplary embodiment of the present invention, television pictures of the video signals are stored alternately in a memory and then the television pictures are read out serially in blocks from the memory and compressed by a compressor. To achieve a high video compression rate, the correlation between successive images should be as high as possible. This, however, may only be possible if only one camera is connected to the compressor. If several cameras are connected via an input switching device, the image after switching to another camera may be totally different from the preceding image. In this case the compression rate may be too low, resulting in a high data flow, which may be avoided with the storage and subsequent compression of successive images of a channel in blocks.

According to a third exemplary embodiment of the present invention, a first television picture of a sequence of several video signals is compressed by a compressor each time and stored as an intermediate image in a memory, whereupon subsequent images of the sequences are compressed alternately by the compressor in dependence on the intermediate image associated with the video signal in each case. Thus, the television pictures of various video signals or various channels reach the compressor alternately, while nevertheless a high compression rate may be achieved by a time-delayed access to the associated intermediate images.

According to a fourth exemplary embodiment of the present invention, a television picture of sequences of several video signals from a compressor is stored as a compressed intermediate image in a memory, and then successive images are compressed alternately by a second compressor in dependence on the relevant intermediate image. This process modification proposes a two-stage compression in which a single-image compression takes place in a first compressor in a first stage and a motion compression in a second compressor in a second stage. The compression may be performed alternately by the two compressors for several video signals or video channels. In the second or motion compressor, the preceding image to be compared with the subsequent image of a channel is read from the memory with a time delay, so that a high compression rate may be achieved for the subsequent image to be compressed in each case.

In an exemplary embodiment, a multiplexer for the conversion of video signals into a serial digital data stream with a compressor comprises a partial image generator with a circuit designed to reduce video signal information and a further circuit designed to combine several video signals into one video signal. Thus, only one video signal is compressed.

In a further exemplary embodiment, a memory is arranged between an input switching device and a compressor in a multiplexer for converting a number of video signals into a serial digital data stream. The memory includes an arrangement for alternate writing of digitized video signals and for reading of the digitized video signals serially in blocks. A block compression and hence a high data rate may be achieved by using the memory.

In an exemplary embodiment, the memory has two memories parts. While data are written into the one memory part, data are read from the second. This process is repeated alternately for the two memories parts.

In a further exemplary embodiment, a compressor in a multiplexer for converting a number of video signals into one serial digital data stream has a memory for images of several video signals. The compressor stores the intermediate results in the memory and processes data several times to achieve a high compression rate.

In a further exemplary embodiment, to achieve a high data compression the compressor in a multiplexer for converting a number of video signals into one serial digital data stream has a series arrangement of a first intermediate image compressor designed to generate an intermediate image, a memory for storing intermediate images, and a second or motion compressor for motion compression. The memory has a small memory capacity.

DETAILED DESCRIPTION

Figure 1:
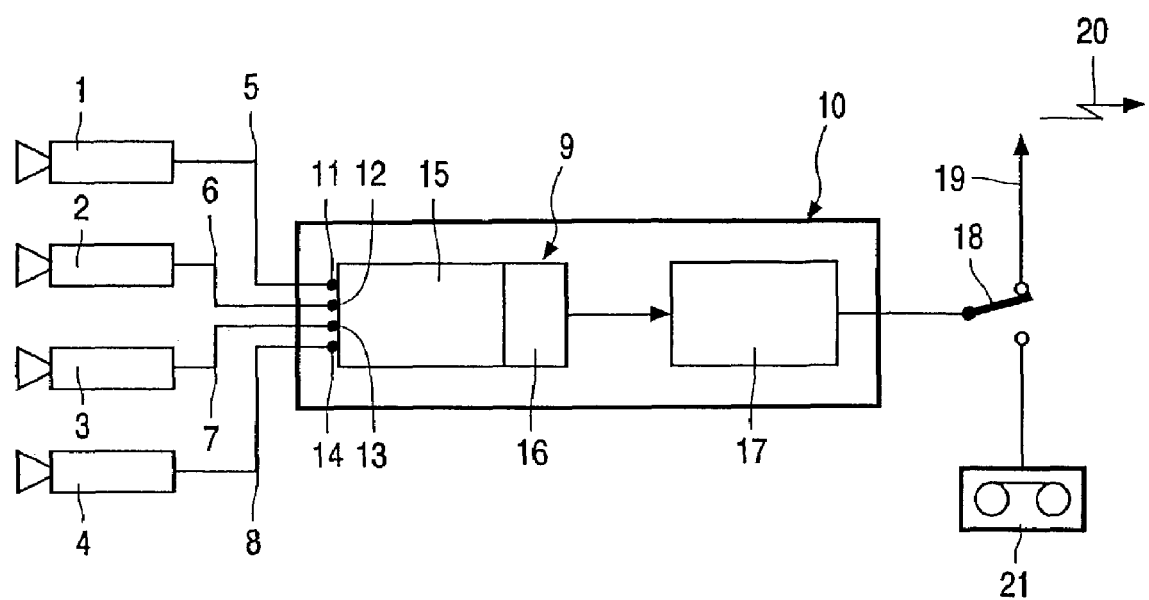
FIG. 1 is a block diagram of the circuit of an exemplary multiplexer which reduces television pictures generated by four cameras and outputs each television picture as a partial image in a quadrant of a single television picture in a multiplexed format.

FIG. 1 shows four television cameras 1 to 4 connected via signal cables 5 to 8 to a partial image generator 9 of an exemplary multiplexing apparatus 10, also referred to below as a multiplexer. Here the partial image generator 9 has four connections 11 to 14 for the signal cables 5 to 8. Pictures are taken with cameras 1 to 4. The cameras 1 to 4 generate electrical signals for the pictures which are output to the partial image generator 9 as video signals via the signal cables 5 to 8. The television cameras 1 to 4 act as video sources and produce digital video signals which are used as television signals in broadcast programs. Each program is also referred to alternatively as a channel, table, or frame. Each digital video signal contains either a digital audio signal, or a data signal, or both. The partial image generator 9 contains a reducing circuit 15 to reduce video signal information and a combination circuit 16 to combine several video signals into one video signal. A signal from the partial image generator 9 is given to a compressor 17 which compresses the signal. The compressed signal is given by the compressor 17 via a switch 18 either to a transmitter 19 and hence to the transmission section 20 or to a digital video recorder 21 for recording.

The function of the multiplexer 10 is as follows: the four television signals generated by the cameras 1 to 4 are reduced to one quarter of their size in the reducing circuit 15 of the partial image generator 9 by blanking out of information, and then combined into a single television signal in the combination circuit 16 of the partial image generator 9. Thus the television pictures taken by the four cameras 1 to 4 may be shown simultaneously on a screen each in one quadrant of the single television picture. The television signal of the single television picture is given to the compressor 17 by the partial image generator 9 and compressed in the compressor 17 in accordance with MPEG2 compression.

The undesired feature of this process is that on replay of a program the image is reproduced unsharply as information has been lost in the combining of the four partial images into a single picture.

Figure 2A:
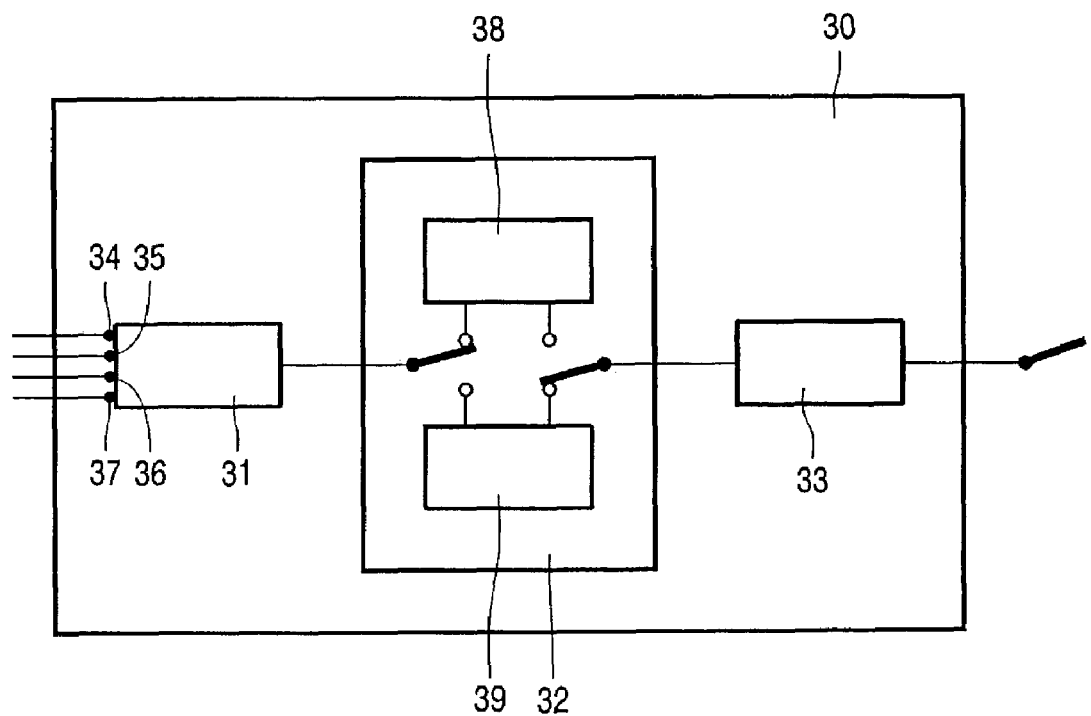
FIG. 2A is a block diagram of the circuit of an exemplary multiplexer with an intermediate memory in which television pictures generated by four cameras are intermediate-stored, and with a compressor which compresses the images channel by channel.

FIG. 2A shows an exemplary multiplexer 30 with an input switching device 31, an intermediate memory 32, and a compressor 33. The input switching device 31 has four connections 34 to 37 for four cameras, the four television signals are sent to the input switching device 31. The signals of all four television pictures are transferred to the intermediate memory 32, which comprises two partial memories 38 and 39 each with a memory space for 4×10 television pictures. The intermediate memory acts as a buffer shift register. Each 10 successive television pictures from all four cameras can be temporarily stored in one of the two partial memories 38 and 39.

The function of the multiplexer 30 is as follows: the input switching device 31 synchronizes the incoming television pictures and transfers the images into the first partial memory 38, while switching takes place after the image of one channel each time, so that the images are transferred alternately. When the first partial memory 38 is filled, switching takes place between the two partial memories, and the second partial memory 39 is filled with television pictures by the input switching device 31. While the second partial memory 39 is being filled, the first partial memory is emptied. Hence, the first partial memory 38 outputs its images, 10 television pictures of a channel each time, in succession and hence serially in blocks, to the compressor 33. The compressor 33 compresses the images. As the images for each channel reach the compressor 33 serially, a high compression rate can be achieved. Every 10th image, i.e. image numbers 1, 11, 21, etc., is then an intermediate image from which compression can be performed forwards or backwards.

Figure 2B:
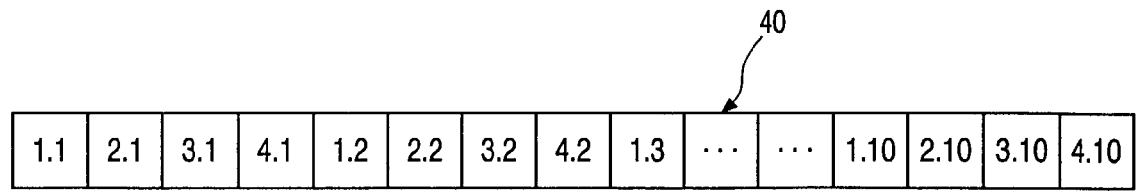
FIG. 2B shows a frame with a sequence of television pictures upstream of the intermediate memory.

FIG. 2B shows a frame 40 with a sequence of television pictures as given by the input switching device 31 to the partial memories 38 and 39. The images are written alternately into the memory 32. A first natural number before the decimal point defines the camera, and a second natural number after the decimal point the sequence of images as sent out by the corresponding camera.

Figure 2C:
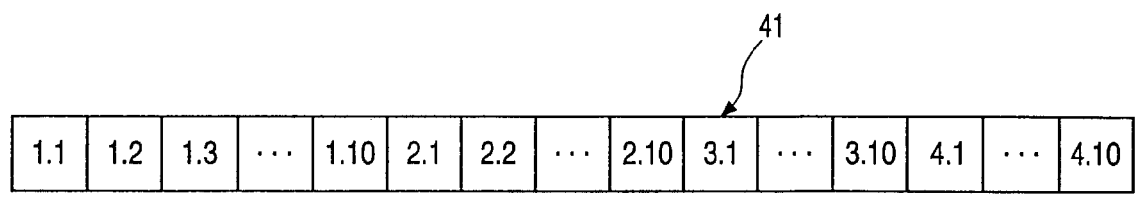
FIG. 2C shows a frame with a sequence of television pictures downstream of the intermediate memory.

FIG. 2C shows the sequence of television pictures in a frame 41 in which these are output from one of the partial memories 38 or 39 to the compressor 33. Each partial memory 38 and 39 thus outputs the 10 images of the first channel, then the 10 images of the second channel, then the 10 images of the third channel, and finally the 10 images of the fourth channel serially in blocks to the compressor 33.

Figure 3A:
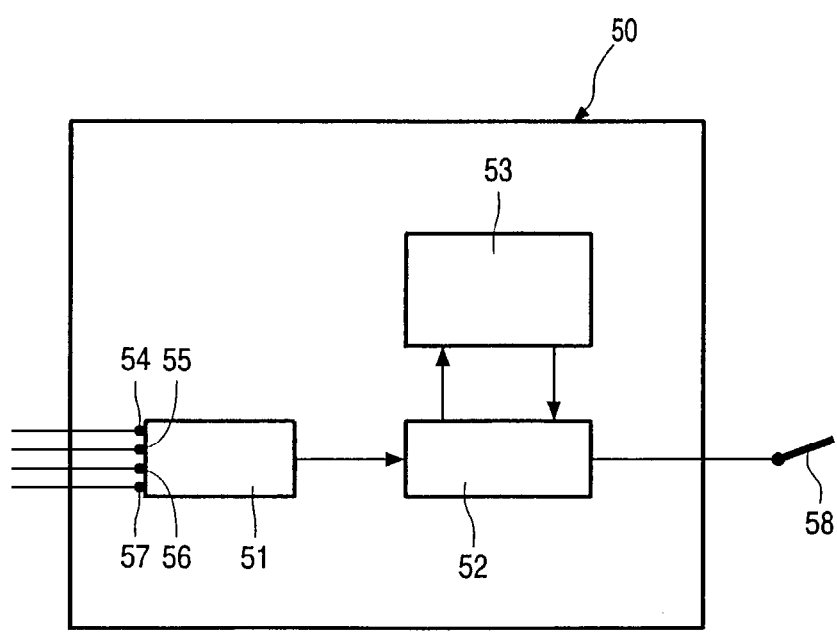
FIG. 3A is a block diagram of the circuit of an exemplary multiplexer with a compressor and with an intermediate memory in which compressed television pictures generated by four cameras and the compression settings are stored.

FIG. 3A shows a multiplexer 50 with an input switching device 51, a compressor 52, and an intermediate memory 53 which reads out the values written first as well, i.e. first in, first out or FIFO. The input switching device 51 has four connections 54 to 57 for four cameras, which deliver four television signals to the input switching device 51. Output signals of the compressor 52 are given to a switch 58. The compressor 52 processes data and stores the data in the memory 53, the same stored data are then transported to the compressor 52 again for further processing.

Figure 3B:
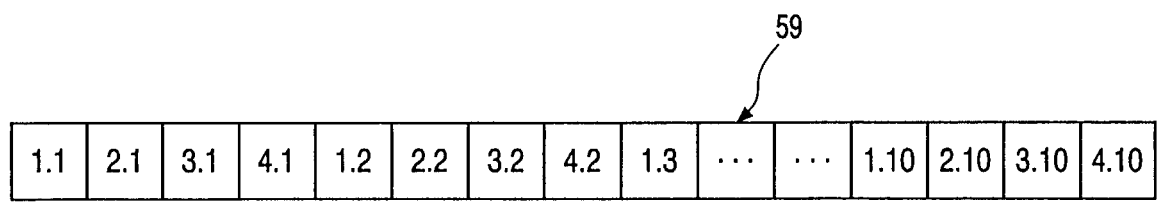
FIG. 3B shows a frame with a sequence of television pictures upstream of the compressor.

FIG. 3B shows a frame 59 with reference to which the functions of the multiplexer 50 will be explained: the input switching device 51 synchronizes the incoming video signals and gives these to the compressor 52. First the first picture from the first camera, then the first picture from the second camera, then the first picture from the third camera, and then the first picture from the fourth camera are given to the compressor 52. Then follows the second picture from the first camera, the second picture from the second camera, the second picture from the third camera, and the second picture from the fourth camera. The compressor 52 compresses the first picture from the first camera and passes this compressed image as an output signal to switch 58 and also to the memory 53. Then the first picture from the second camera is compressed in the compressor 53 and both passed as an output signal to switch 58 and at the same time written to memory 53. The first picture from the third camera is also compressed and output to switch 58 and written into the memory 53. The same happens with the first picture from the fourth camera. At the start of the second cycle, the compressed first picture from the first camera is loaded from the memory 53 into the compressor 52 and compared with the second picture from the first camera which is given to the compressor 52 by the input switching device 51. An MPEG2 compression takes place in the compressor 52 on the basis of an image comparison. The corresponding settings are stored in the memory 53 and at the same time output to switch 58. The same happens for the second pictures from the second, third, and fourth cameras. A third cycle then takes place with the third pictures from the first, second, third and fourth cameras. After every ten or twelve pictures from a camera, a new intermediate image is set from which compression can take place in forward or backward direction.

Figure 4:
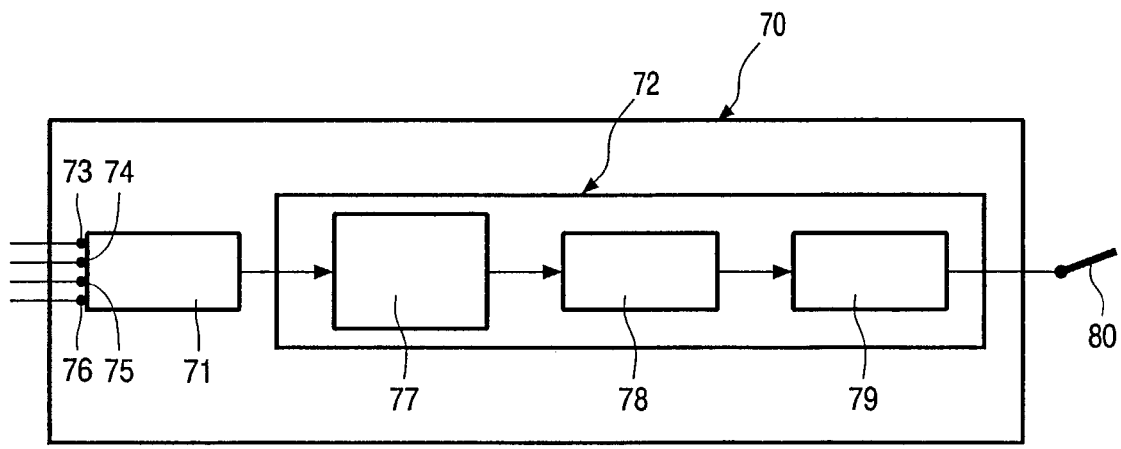
FIG. 4 is a block diagram of the circuit of an exemplary multiplexer with a compressor which has an intermediate image compressor, an intermediate image memory, and a motion compressor connected in series.

FIG. 4 shows a multiplexer 70 with an input switching device 71 and a compressor 72. The input switching device 71 has four connections 73 to 76 for four cameras, which output four television signals to the input switching device 71. The signals from all four television pictures are transferred to the compressor 72, as shown in frame 59. The compressor 72 has a first intermediate image compressor 77, an intermediate memory 78, and a second motion compressor 79 and acts as an MPEG2 compressor, typically compressing every tenth or twelfth image from a camera into a compressed intermediate image known as an intra-frame or I-frame for short, i.e. a JPEG compressed single image. In the MPEG2 process, the I-frames are sent as intermediate images at regular intervals, preferably after ten or twelve transferred images. By using the intermediate images, a new intermediate image may be provided as a starting image in the case of failure of the transfer section after the tenth or twelfth image at the latest. On cross-fading, too, a new intermediate image is sent as a start image. Only the changes with respect to the previous image or previous I-frame are stored so as to achieve a high data rate on the digital video recorder or transfer section, in addition to the JPEG compression method of the other intermediate images. Changes within an image may occur only if an object is moved. The data quantity or data rate may thus be reduced. Between these I-frames, data are only transferred for moved image segments. In the MPEG process, therefore, only those data are transferred which identify the modified image segments. The input switching device 71 constantly supplies all pictures from all four cameras to the first compressor 72, which for each camera produces an I-frame after ten or twelve images or after cross-fading. The I-frame is temporarily stored in the intermediate memory 78 and retained there for a period of ten or twelve images if no cross-fading occurs. Furthermore, compression settings for subsequent images are also temporarily stored. The memory 78 is accordingly dimensioned such that four compressed television pictures, one for each camera, and compression settings can be stored. If an MPEG2 process with ten or twelve images is assumed, an I-frame will be produced for every tenth or twelfth image of a camera, i.e. sequential image numbers 1, 11, 21, 31, etc. or 1, 13, 25, 37, etc. The I-frame and the compression settings are supplied constantly to the second compressor 79 over a period of ten or twelve images and simultaneously all intermediate images 2 to 10, 12 to 20, 22 to 30 or 2 to 12, 24 to 24, 26 to 36, etc. of each camera are looped through to the motion compressor 79. The second compressor 79 compares the I-frame with the new image with regard to compression settings of the camera concerned, and produces only those data which identify changes with respect to the preceding image or I-frame for images between the I-frames. An I-frame is delivered to a switch 80 for each camera every ten or twelve images, and in between those data relating to the other images which contain changes of an image in relation to the preceding image or I-frame.

The invention claimed is:

1. A multiplexer apparatus, comprising:
an input switching device configured to simultaneously receive in parallel a plurality of input video signals and generate a single output stream, each of the input video signals including an ordered stream of television pictures, the output stream including all of the television pictures of the plurality of input video signals, wherein the input switching device is configured to interleave the television pictures from each of the input video signals into the output stream so that a first television picture from each input video signal is placed in the output stream before a second television picture from any of the input video signals is placed in the output stream;
a compressor configured to receive the output stream from the input switching device, to compress the first television picture of each input video signal into a corresponding intermediate compressed image for each input video signal, and subsequently to compress a plurality of successive television pictures of each particular input video signal as a function of the intermediate compressed image corresponding to the particular input video signal, wherein the compressor is configured to compress the television pictures of the input video signals in the order in which they are placed in the output stream so that the second television picture from each input video signal is compressed before a third television picture of any of the input video signals is compressed; and
a memory to store the intermediate compressed images corresponding to the plurality of input video signals.

2. The multiplexer apparatus of claim 1, wherein the memory is a first-in-first-out (FIFO) memory configured to, in a first cycle, receive and store the intermediate compressed images corresponding to the plurality of input video streams in a same order as the first television pictures of each of the input video signals is interleaved into the output stream by the input switching device.

3. The multiplexer apparatus of claim 2, wherein, in each of a plurality of cycles after the first cycle, the FIFO memory outputs the stored intermediate compressed images to the compressor in the order in they were stored in the FIFO memory.

4. The multiplexer apparatus of claim 1, further comprising an output switch configured to selectively connect the output of the compressor to one of a plurality of different output devices.

5. The multiplexer apparatus of claim 4, further comprising the plurality of different output devices, including a recording device and a transmitter.

6. The multiplexer apparatus of claim 4, wherein the compressor is configured to output the intermediate compressed images to the output switch in addition to the memory.

7. The multiplexer apparatus of claim 1, wherein the compressor is configured to perform an MPEG2 compression.

8. The multiplexer apparatus of claim 1, wherein the compressor is configured to generate new intermediate compressed images corresponding to each of the plurality of input video streams after compressing a predetermined number of the plurality of successive television pictures of each of the input video streams as a function of the original corresponding intermediate compressed images.

9. The multiplexer apparatus of claim 8, wherein the compressor is configured to compress a second plurality of successive television pictures of each of the input video streams as a function of the new intermediate compressed images corresponding to each of the plurality of input video streams.

10. A method performed by a multiplexer apparatus, comprising:
in the multiplexer apparatus, simultaneously receiving in parallel a plurality of input video signals, each of the input video signals including an ordered stream of television pictures:
generating a single output stream including all of the television pictures of the plurality of input video signals, wherein the generating includes interleaving the television pictures from each of the input video signals into the output stream so that a first television picture from each of the input video signal is placed in the output stream before a second television picture from any of the input video signals is placed in the output stream;

compressing the television picture of each input video signal into a corresponding intermediate compressed image for each input video signal;

storing the intermediate compressed images corresponding to the plurality of input video signals in a memory; and compressing a plurality of successive television pictures of particular input video signal as a function of the intermediate compressed image corresponding to the particular input video signal, wherein the compressing compresses the television pictures of the input video signals in the order in which they are placed in the output stream so that the second television picture from each input video signal is compressed before a third television picture of any of the input video signals is compressed.

11. The method of claim 10, wherein the memory is a first-in-first-out (FIFO) memory, and the storing of the intermediate compressed images includes, in a first cycle, receiving and storing the intermediate compressed images corresponding to the plurality of input video streams in the FIFO memory in a same order as the first television pictures of each of the input video signals is interleaved into the output stream.

12. The method of claim 11, further comprising outputting, in each of a plurality of cycles after the first cycle, from the FIFO memory the stored intermediate compressed images, in the order in they were stored in the FIFO memory, for the compressing of the plurality of successive television pictures of the plurality of input video signals.

13. The method of claim 10, further comprising outputting compressed images, generated by the compressing of the plurality of successive television pictures of the plurality of input video signals, to a selected one of a plurality of different output devices.

14. The method of claim 13, wherein the plurality of different output devices includes a recording device and a transmitter.

15. The method of claim 13, further comprising, in addition to storing the intermediate compressed images in the memory, outputting the intermediate compressed images to the selected one of the plurality of different output devices.

16. The method of claim 10, wherein the compressing of the first television pictures and the plurality of successive television pictures of the plurality of input video signals includes performing an MPEG2 compression.

17. The method of claim 10, further comprising generating new intermediate compressed images corresponding to each of the plurality of input video streams after compressing a predetermined number of the plurality of successive television pictures of each of the input video streams as a function of the original corresponding intermediate compressed images.

18. The method of claim 17, further comprising compressing a second plurality of successive television pictures of each of the input video streams as a function of the new intermediate compressed images corresponding to each of the plurality of input video streams.

* * * * *

UNITED STATES PATENT AND TRADEMARK OFFICE
CERTIFICATE OF CORRECTION

PATENT NO. : 7,590,178 B2  Page 1 of 1
APPLICATION NO. : 10/275630
DATED : September 15, 2009
INVENTOR(S) : Bergen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 330 days.

Signed and Sealed this
Fifteenth Day of February, 2011

David J. Kappos
*Director of the United States Patent and Trademark Office*